US006178103B1

United States Patent
Deng et al.

(10) Patent No.: US 6,178,103 B1
(45) Date of Patent: Jan. 23, 2001

(54) METHOD AND CIRCUIT FOR SYNCHRONIZING PARALLEL VOLTAGE SOURCE INVERTERS

(75) Inventors: Doug D. Deng; Kon-King Mike Wang; Vijay Bhavaraju, all of Canton, MI (US)

(73) Assignee: Ford Global Technologies, Inc., Dearborn, MI (US)

( * ) Notice: Under 35 U.S.C. 154(b), the term of this patent shall be extended for 0 days.

(21) Appl. No.: 09/567,965

(22) Filed: May 10, 2000

(51) Int. Cl.[7] ................................................... H02M 7/00
(52) U.S. Cl. ...................................................................... 363/71
(58) Field of Search .................................. 363/65, 71, 72; 307/82

(56) References Cited

U.S. PATENT DOCUMENTS

| | | |
|---|---|---|
| 3,621,365 | 11/1971 | Beck et al. . |
| 4,171,517 | 10/1979 | Higa et al. . |
| 4,733,341 | 3/1988 | Miyazawa . |
| 5,016,158 | 5/1991 | Matsui et al. . |
| 5,027,265 | 6/1991 | Dhyanchand et al. . |
| 5,257,180 | 10/1993 | Sashida et al. . |
| 5,285,371 | 2/1994 | Sanada et al. . |
| 5,436,823 | 7/1995 | Araki . |
| 5,473,528 | 12/1995 | Hirata et al. . |
| 5,546,298 | 8/1996 | Rohner . |
| 5,745,356 | * 4/1998 | Tassitino, Jr. et al. ................. 363/71 |
| 5,883,797 | * 3/1999 | Amaro et al. .......................... 363/65 |
| 6,088,248 | * 7/2000 | Schenk et al. .......................... 363/65 |

* cited by examiner

*Primary Examiner*—Matthew Nguyen
(74) *Attorney, Agent, or Firm*—Mark S. Sparschu

(57) ABSTRACT

An inverter circuit (10) has a plurality of voltage source inverters (VSI) coupled in parallel. Each of the voltage source inverters are coupled to a load (14). A synch signal source (12) generates a square wave from a fundamental operating frequency. The square wave generated by the synch signal source (12) is coupled to each voltage source inverter (VSI). Each voltage source inverter VSI has a timer counter (22), a microprocessor (26), and an inverter (32). The timer counter (22) is preferably a triangle wave generator that corresponds to the time since a rising edge of a synch signal (18) The microprocessor (26) samples the cyclic output signal (24) and determines a phase angle for the voltage source inverter. The phase angle and the voltage magnitude are provided to the inverter (32). The inverter (32) provides an output signal to the load that has the same phase angle as the outputs of the other phase inverters.

19 Claims, 1 Drawing Sheet

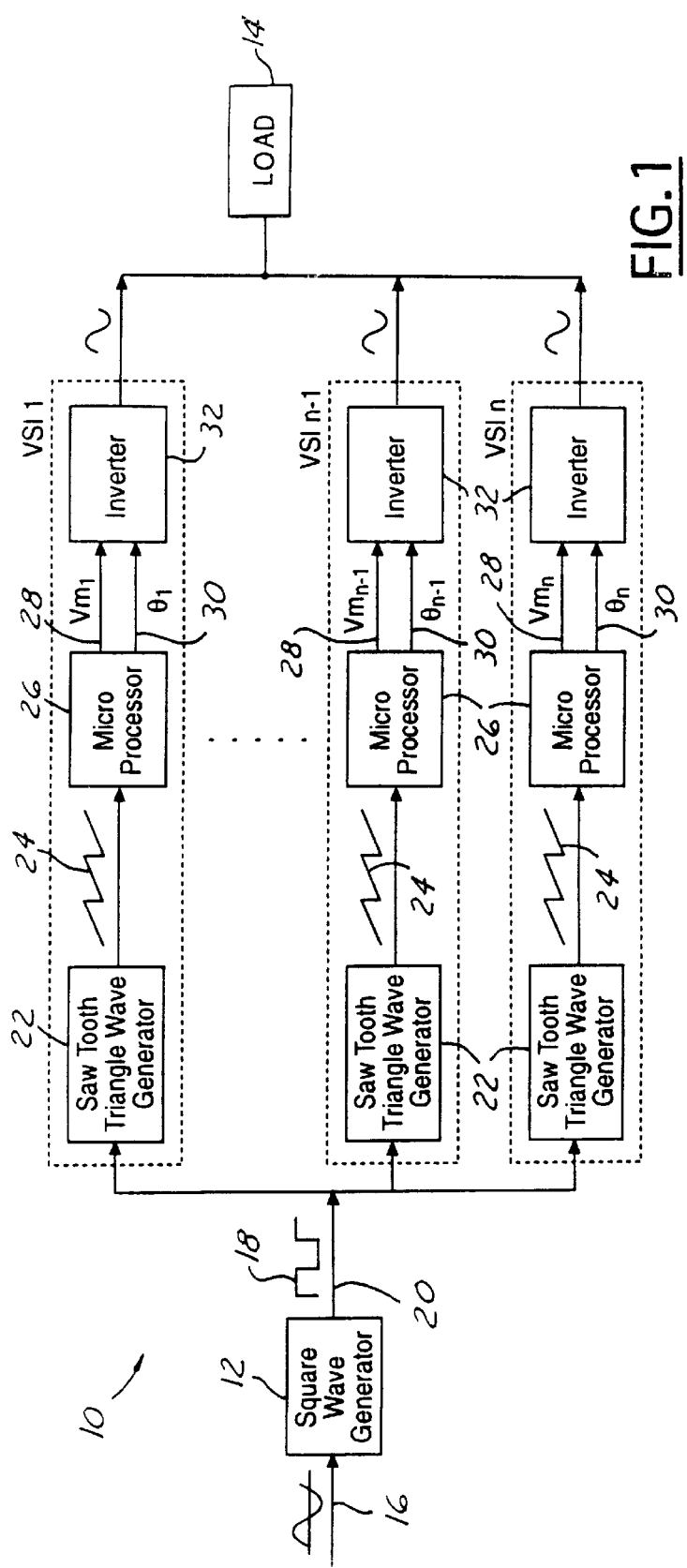
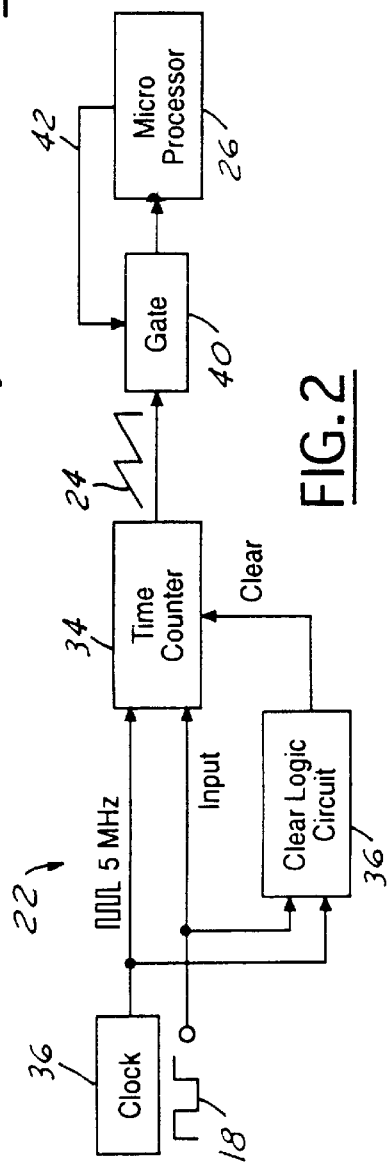
FIG. 1
FIG. 2

METHOD AND CIRCUIT FOR SYNCHRONIZING PARALLEL VOLTAGE SOURCE INVERTERS

TECHNICAL FIELD

The present invention relates generally to voltage source inverters, and more specifically, to a synchronization circuit for synchronizing the output of parallel voltage source inverters.

BACKGROUND

To generate high power outputs for an AC source, it is common to place a number of electronic voltage source inverters in parallel. Each of the voltage source inverters has an associated phase angle. One known problem with placing voltage source inverters in parallel is that if the phase angles are not the same in each of the parallel voltage source inverters, circulating real power between the voltage sources may be developed. Circulating real power reduces the capability and efficiency of the voltage sources. Further, circulating real power may also cause the malfunctioning of the voltage source inverter.

It is therefore one object of the invention to provide a voltage inverter circuit having the phase angles synchronized to minimize real power circulation.

SUMMARY OF THE INVENTION

It is therefore one object of the invention to provide a circuit having parallel voltage source inverters that are configured to minimize circulating real power among the inverters. The parallel voltage source inverters essentially become electrically equivalent by the present invention to eliminate the circulating real power.

In one aspect of the invention an inverter circuit comprises a synchronization signal source having a first frequency and a first phase. A first voltage source inverter circuit is coupled to a load and the synch source. The first voltage source inverter circuit comprises a cycle time counter generating a cyclic output signal and a first sampling circuit receiving the cyclic output signal and sampling said cyclic output signal. The first sampling circuit generates a magnitude signal and a phase signal in response to said cyclic output signal. The first inverter circuit generates an output signal having a first phase in response to the magnitude signal and the phase signal. A second voltage source inverter circuit is coupled to the load in parallel with the first voltage source inverter and to the synch signal source. The first voltage source inverter circuit has a second cycle time counter generating a cyclic output signal. The first sampling circuit receives the cyclic output signal and samples the cyclic output signal. The first sampling circuit generates a magnitude signal and a second phase signal in response to the cyclic output signal. The second phase signal and the first phase signal being substantially equal.

In a further aspect of the invention, a method for generating a voltage signal using a first inverter circuit and parallel with the second inverter circuit comprising the steps of:

generating a synch signal having a first frequency and a first phase;

continuously counting cycle times of the synch signal in a first inverter circuit;

sampling a first cycle time from the cycle times at a first sample moment;

calculating a first phase angle in response to the first cycle time;

generating an output signal from a first inverter circuit having the first phase angle;

counting cycle times of the synch signal in a second inverter circuit;

sampling a second cycle time at a second sampling moment;

calculating a second phase angle in response to said second cycle time;

generating a second output signal from said second inverter circuit having a second phase wherein said second phase angle is substantially equal to said first phase angle.

One advantage of the invention is that a sawtooth generator may be used to generate the cyclic output signal that represents the phase angle. This eliminates the usually strict requirement that the updating rate of each of the voltage source inverters must be the same and that the updating cycle must be synchronized for the phase angle synchronization among the voltage source inverters. Another advantage of the invention is that the fundamental operating frequency and the sampling frequency of the microprocessor do not need strict synchronization. Another advantage of the invention is that no analog-to-digital conversion is required between the microcontroller and the sawtooth wave generator. Yet another advantage of the invention is that the synchronous signal source is digital which has much better noise immunity than analog signals. Also, the digital signal is based on a relatively low frequency and thus the bandwidth requirements for transmission among the parallel voltage source inverters is low.

In combination, the advantages result in increased reliability, robustness and better performance of the voltage source.

Other objects and features of the present invention will become apparent when viewed in light of the detailed description of the preferred embodiment when taken in conjunction with the attached drawings and appended claims.

BRIEF DESCRIPTION OF THE DRAWINGS

FIG. 1 is a block diagrammatic view of an inverter circuit according to the present invention.

FIG. 2 is a block diagrammatic view of the sawtooth triangle wave generator of FIG. 1.

DESCRIPTION OF THE PREFERRED EMBODIMENT

In the following figures the same reference numeral is used to identify the same components in the two views. The present invention is particularly suited for applications requiring parallel voltage sources including power sources. However, those skilled in the art will recognize that the present invention may be applicable to other areas including motor controls.

Referring now to FIG. 1, an inverter circuit 10 has a synchronization (synch) signal source 12 coupled to a plurality of voltage source inverter circuits (VSI 1, VSI n-1, and VSI n). Although three voltage source inverter circuits (VSI) are illustrated, various numbers of voltage source inverter circuits may be used depending on the output power to be provided as would be evident to those skilled in the art. The output of each voltage source inverter circuit VSI 1, VSI n-1, and VSI n are coupled to a common load 14.

Synch signal source 12 is illustrated as a square wave generator. However, those skilled in the art would recognize that other types of synch signal sources may be used. Synch signal source 12 has a fundamental operating frequency input 16. A suitable fundamental operating frequency is a relatively low frequency, e.g., preferably about 50 or 60 Hz. The preferred fundamental operating frequency is the frequency provided through the connection to the power companies. The synch signal source 12 generates a synch signal represented by reference numeral 18 through an output 20. The synch signal 18 has a first frequency corresponding to the fundamental operating frequency and a phase also corresponding to the fundamental operating frequency. As mentioned above, a square wave generator is used as the synch signal source. The square wave is a digital signal and is consequently less susceptible to noise during transmission to the VSIs.

Each of the VSIs are configured in a similar manner and therefore the operation and components of only one will be described. Each VSI has a timer counter 22 such as a sawtooth wave generator. Timer counter 22 generates a cyclic output signal 24 which has a magnitude corresponding to a count of the cycle time of the square wave. For example, the cyclic output signal 24 may, for example, correspond to the time since the last rising edge of the synch signal square waves. The timer counter 22 converts the square wave synch signal 18 into cyclic output signal 24, which is a sawtooth wave. The frequency of the sawtooth wave is the same as the synch signal. Also, the sawtooth cyclic output signal 24 also has the same phase as the square wave signal.

A microprocessor 26 is used to sample the cyclic output signal 24. The sampling frequency should be much higher than the synchronization signal frequency of 50 to 60 Hz. A suitable range of the sampling frequency is between about 2,000 and 20,000 Hz. The sample by the microprocessor of the cyclic output signal 24 corresponds to a time elapsed from the previous rising edge of the phase synch signal. Using the elapsed time, the phase angle at the sampling moment may be calculated by the following equation:

$$\theta_k = t_x \cdot f_e \cdot 360°$$

where $t_s$ is the elapsed time from the rising edge at the sampling moment, $f_e$ is the fundamental operating frequency (50 or 60 Hz) of the VSI.

The microprocessor has two outputs; a magnitude output 28 and a phase angle output 30. The phase angle and the magnitude are coupled to an inverter 32. Inverter 32 provides a synchronized signal to load 14 corresponding to $V_m * \sin\theta$. Thus, the phase angles of the outputs of each VSI may be synchronized.

Referring now to FIG. 2, timer counter circuit 22 is illustrated in further detail. Timer counter 22 has a time counter 34 that is coupled to a time source such as a clock 36 and to square wave generator 10 for receiving synch signal 18. The output of time counter 34, as mentioned above, is a measurement of time from the last rising edge of the synch signal 18. Thus, the cyclic output signal 24 starts at zero upon a rising edge of the synch signal and increases until a new rising edge is presented. Clear logic circuit 36 monitors the synch signal 18 and resets time counter 34 upon the rising edge. Of course, other triggers such as a falling edge may be used for resetting. As long as a consistent portion of synch signal 18 is monitored, the phase of the cyclic output signal 24 is the same as the phase of synch signal 18.

The microprocessor 26 is coupled to gate 40 for receiving cyclic output signal 24. Gate 40 is coupled to a sampling line 42 of microprocessor 26 to control the sampling of the cyclic output signal 24. Because the magnitude of the cyclic output signal 24 corresponds to the time since the last rising edge, the phase angle of the signal may be calculated by microprocessor 26 using the equation above. Thus, the inverter may then output a common phase angle signal for each of the VSIs.

In operation, the synch signal 18 is derived from a fundamental operating frequency. The square wave signal has a first frequency and a first phase angle. The time counting circuit 22 calculates the time since the last rising edge of the synch signal. Because this signal directly corresponds to the time since the last rising edge, the phase angle may be derived therefrom. The microprocessor 26 samples the cyclic output signal 24 that corresponds to the time and thus the phase of the output of the microprocessor 26 may be set to provide the inverter with the same signal as the other microprocessors provide to the other inverters. Thus, the output of each of the inverters is synchronized in terms of phase angle and thus real power will not be circulated through the inverter circuit 10.

While particular embodiments of the invention have been shown and described, numerous variations alternate embodiments will occur to those skilled in the art. Accordingly, it is intended that the invention be limited only in terms of the appended claims.

What is claimed is:

1. An inverter circuit comprising:
   a synch signal source having a first frequency and a first phase;
   a first voltage source inverter circuit coupled to a load and said synch signal source, said first voltage source inverter circuit comprising a cycle time counter generating a first cyclic output signal, a first sampling circuit receiving said first cyclic output signal and sampling said first cyclic output signal, said first sampling circuit generating a magnitude signal and a first phase signal in response to said first cyclic output signal;
   a second voltage source inverter circuit coupled to said load in parallel with said first voltage source circuit, said second voltage source inverter circuit coupled to said synch signal source, said second voltage source inverter circuit comprising a second cycle time counter generating a second cyclic output signal, a second sampling circuit receiving said second cyclic output signal and sampling said cyclic output signal, said second sampling circuit generating a magnitude signal and a second phase signal corresponding to said second cyclic output signal, said second phase signal having a phase substantially similar to said first output signal.

2. An inverter circuit as recited in claim 1 wherein said first sampling circuit comprises a first microprocessor and said second sampling circuit comprises a second microprocessor.

3. An inverter circuit as recited in claim 1 wherein said cycle time counter comprises a triangle wave generator.

4. An inverter circuit as recited in claim 1 wherein said cycle time counter circuit comprises a timer counter coupled to a clock source and said synchronous signal source.

5. An inverter circuit as recited in claim 1 wherein said timer counter generates a phase angle signal having a second frequency signal corresponding to said first frequency and a second phase signal corresponding to said first phase signal.

6. An inverter circuit as recited in claim 1 wherein said first sampling circuit has a sampling frequency substantially greater than said first frequency.

7. An inverter circuit as recited in claim 1 wherein said sampling frequency is between about 2,000 and about 20,000 Hz.

8. A method for generating a voltage signal using a first inverter circuit in parallel with a second inverter circuit comprising the steps of:
  generating a synch signal having a first frequency and a first phase;
  continuously counting cycle times of the synch signal in a first inverter circuit;
  sampling a first cycle time from the cycle times at a first sample moment;
  calculating a first phase angle in response to the first cycle time;
  generating an output signal from the first inverter circuit having the first phase angle;
  counting cycle times of the synch signal in a second inverter circuit;
  sampling a second cycle time at a second sampling moment;
  calculating a second phase angle in response to said second cycle time;
  generating a second output signal from said second inverter circuit having a second phase wherein said second phase angle is substantially equal to said first phase angle.

9. An inverter circuit as recited in claim 8 wherein said cycle time counter comprises a time counter and a clear logic circuit coupled to said time counter.

10. An inverter circuit as recited in claim 8 further comprising a clock coupled to the time counter, said time counter counting the clock pulses since a clear logic signal from said clear logic circuit.

11. A method as recited in claim 9 wherein said step of generating a synch signal comprises a step of generating a square wave signal.

12. A method as recited in claim 9 wherein said step of counting a first cycle of the first synch signal comprises the steps of generating a triangle wave having a third frequency and a third phase corresponding to the first frequency and the first phase.

13. A method as recited in claim 9 wherein said step of generating a triangle wave comprises counting the time since a rising edge of the synch signal.

14. A method as recited in claim 9 further comprising the step of clearing a timer in response to a rising edge of the synch signal.

15. An inverter circuit comprising:
  a synch source generating a synch signal having a first frequency and a first phase;
  a first voltage source inverter circuit coupled to a load and to receive said synch signal, said first voltage source inverter circuit comprising a cycle time counter counting a first time since a predetermined portion of said synch signal, a first sampling circuit receiving said first time and calculate a first phase angle therefrom;
  a second voltage source inverter circuit coupled to said load, in parallel with said first voltage source and coupled to receive said synch signal, said second voltage source inverter circuit comprising a second cycle time counter for counting a second time since a predetermined portion of said synch signal;
  a first inverter circuit coupled to said first sampling circuit for generating an output signal having an output phase; and
  a second inverter circuit coupled to said second sampling circuit generating a second output signal having the output phase.

16. An inverter circuit as recited in claim 15 wherein said first sampling circuit comprises a first microprocessor and said second sampling circuit comprises a second microprocessor.

17. An inverter circuit as recited in claim 16 wherein said cycle time counter comprises a triangle wave generator.

18. An inverter circuit as recited in claim 16 wherein said cycle time counter circuit comprises a timer counter coupled to a clock source and said synch signal source.

19. An inverter circuit as recited in claim 16 wherein said first sampling circuit has a sampling frequency substantially greater than said first frequency.

* * * * *